United States Patent [19]
Ichikawa et al.

[11] Patent Number: 5,893,665
[45] Date of Patent: *Apr. 13, 1999

[54] IMAGE FORMING APPARATUS

[75] Inventors: Kazuhiro Ichikawa; Yoshiro Koga, both of Nagano, Japan

[73] Assignee: Seiko Epson Corporation, Tokyo, Japan

[*] Notice: This patent is subject to a terminal disclaimer.

[21] Appl. No.: 08/915,724

[22] Filed: Aug. 21, 1997

Related U.S. Application Data

[63] Continuation of application No. 08/736,203, Oct. 25, 1996, Pat. No. 5,697,033.

[30] Foreign Application Priority Data

Oct. 25, 1995 [JP] Japan ..................... 7-300696

[51] Int. Cl.⁶ ..................... G03G 15/16; G03G 13/16
[52] U.S. Cl. ..................... 399/314; 430/126
[58] Field of Search ..................... 399/310, 313, 399/314, 174; 361/225; 430/126

[56] References Cited

U.S. PATENT DOCUMENTS 3,936,174  2/1976  Carpenter ..................... 399/313
4,341,456  7/1982  Iyer et al. ..................... 399/297
5,697,033  12/1997  Ichukawa et al. ..................... 399/310

FOREIGN PATENT DOCUMENTS 6-202496  7/1994  Japan.
7-20733  1/1995  Japan.

*Primary Examiner*—Joan H. Pendegrass
*Attorney, Agent, or Firm*—Sughrue, Mion, Zinn, Macpeak & Seas, PLLC

[57] ABSTRACT

A transfer means has a film lightly contacting a back surface of a transfer medium and applying a transfer field thereto. The film rises rapidly with respect to a contact portion with the back surface of the transfer medium on the upstream side of the direction of movement of the transfer medium relative to the film, and slopes gently from the contact portion in a continuous curve on a downstream side of the direction of movement. The film is capable of displacement between a support and an image carrier, and contacts and disengages the transfer medium according to the presence or absence of electrostatic adsorptive force due to the supply or withdrawal of an electric current.

3 Claims, 7 Drawing Sheets

IMAGE FORMING APPARATUS

This is a continuation of application Ser. No. 08/736,203 filed Oct. 25, 1996, now U.S. Pat. No. 5,697,033.

BACKGROUND OF THE INVENTION

1. Field of the Invention

The invention relates to an image forming apparatus such as a copier, printer or facsimile machine employing a toner to form images. In particular, the invention relates to transfer technology for transferring a toner image formed on a surface of an image carrier (a photosensitive body etc.) on to a surface of a transfer medium (recording medium etc.).

2. Description of the Related Art

Generally speaking, in an image forming apparatus employing a toner to form images, it is necessary to transfer an image formed on a surface of an image carrier such as a photosensitive drum or the like onto a transfer medium such as a paper.

In order to faithfully transfer an image formed on a surface of an image carrier onto a transfer medium such as a paper so that it will reproduce well, it is necessary to prevent splashing of toner in the vicinity of a transfer portion.

In order to meet this demand with a relatively simple construction, the image forming apparatus of Japanese Patent Publication Hei. 6-202496, having the transfer structure shown in FIG. 10 has been proposed.

In FIG. 10, the reference numeral 1 indicates an image carrrier member (photosensitive drum), upon the surface of which a toner image is formed. The reference numeral 6 is a transfer medium, and 8 is a transfer medium support.

The refernce numeral 4 is a transfer charging means, comprising a conductive layer 401 made of a conductive rubber which has a shaped of a rectangular plate-like piece elongated in a direction perpendicular to the direction of conveyance of the transfer medium, and a highly conductive electrode 402 bonded to conductive layer 401 by means of a conductive adhesive and capable of applying a uniform current in the direction of thrust with respect to conductive layer 401. An abutting layer 405 having a lower coefficient of friction than that of the conductive layer 401 is provided by coating or the like on an upper surface of the conductive layer 401 contacting the transfer medium support 8. Further, a pushing member 404 (formed of a plate-like or film-like flexible member or the like) is disposed in an opposite side to that in which the abutting layer 405 of conductive layer 401 is arranged with respect to an electrical field applying member comprising the electrode 402, conductive layer 401 and abutting layer 405; and a uniform pushing force suitable for transfer is obtained in a sideways direction.

According to this kind of the image forming apparatus, a latent image is formed on the surface of the image carrying member 1, which rotates in the direction of arrow B in FIG. 10, by means of a laser beam or the like (not shown in the drawing), and this latent image forms a toner image on the surface of the image carrying member 1 by means of being developed by a developing means not shown in the drawing.

The transfer medium 6 is transported by the transfer medium support 8 in the direction of arrow A, and the toner image on the surface of the image carrying member 1 is transferred onto the transfer medium 6 by the application of an electric field by transfer charging means 4 at a transfer portion 3 (the portion contacting image carrier 1).

In the image forming apparatus described above, the shape of transfer charging means 4, positioned further downstream in the direction of conveyance of the transfer medium 6 than the transfer portion 3, is such that it is rectilinear and drops away suddenly due to the upper surface 4a and side surface 4b. Because of this, the electrical field positioned-downstream of the transfer portion changes suddenly, static electrical discharge occurs easily, and toner splash (especially splashing of the toner after transfer to the transfer medium 6) is created, and as a result, the problem arises that there is a fear that it will not be possible to carry out faithful transfer of a toner image which can be reproduced well onto the transfer medium.

SUMMARY OF THE INVENTION

The objective of the present invention is to solve the problem mentioned above, to avoid the occurrence of static electric discharge on the downstream side of the transfer portion, and consequently to provide an image forming apparatus wherein it is possible to be able to carry out faithful transfer of a toner image which can be reproduced well onto the transfer medium.

In order to achive the above objective, an image forming apparatus according to the present invention comprises: an image carrier, a toner image being formed on a surface thereof; and a transfer means for applying a transfer field between the image carrier and a moving transfer medium to transfer the toner image formed on the surface of the image carrier onto a surface of the moving transfer medium, the transfer means having a film lightly contacting a back surface of the transfer medium and applying the transfer field thereto; wherein the film of the transfer means rises rapidly with respect to a contact portion with the back surf-ace of the transfer medium upstream of a direction of movement of the transfer medium relative to the film, and slopes gently from the contact portion in a continuous curve downstream of the direction of movement.

In the above image forming apparatus, the film may be supported by a support disposed separated by a gap from the image carrier, in this case, the film is capable of displacement between the support and the image carrier, and contacts and disengages the transfer medium according to presence and absence of electrostatic adsorptive force due to supply and withdrawal of an electric current.

Furthermore, apart from such as a photosensitive member forming a toner image directly, the 'image carrier' includes an intermediate transfer medium, upon the surface of which is formed a toner image transferred from a photosensitive member etc. Yet further, apart from a recording medium such as a paper onto which a toner image is finally transferred, 'transfer medium' includes an intermediate transfer medium between a photosensitive member and a recording medium, transferring a toner image from the photosensitive member is transferred.

According to the image forming apparatus according to the present invention, a toner image formed on the surface of an image carrier is transferred onto the surface of a transfer medium by the action of an electrical field applied between the image carrier and transfer medium by means of a transfer means.

As the transfer means lightly contacts the back surface of the transfer medium, and has a film applying the transfer field, the transfer field is applied between the image carrier member and transfer medium.

Then, as the film lightly contacts the back surface of the transfer medium, the film does not develop a great resistance with respect to the moving transfer medium, and consequently a smooth movement of the transfer medium is obtained. Furthermore, supposing the film was constructed in such a way that it did not contact the transfer medium, the transfer field applied between the image carrier and transfer medium would broaden and it would become easy for toner splashing to occur, but according to the construction according to the present invention, as the film lightly contacts the back surface of the transfer medium, broadening of the transfer field is prevented and it is difficult for the toner to splash.

So furthermore, because the film rises rapidly with respect to the contact portion of the back surface of the transfer medium upstream in the direction of movement of the transfer medium with respect to the film, and slopes gently in a continuous curve from the contact portion downstream in the direction of movement, the transfer field rises rapidly upstream of the contact portion, and drops away gently downstream of the contact portion. Supposing the transfer field is constructed in such a way that it rises gently upstream of the contact portion; the toner which adheres to the surface of the image carrier (untransferred toner) will begin to splash irregularly towards the surface of the transfer medium before reaching the contact portion, and there is a fear that it will not be possible to carry out faithful transfer of a toner image which can be reproduced well. Yet further, supposing the transfer field drops rapidly on the downstream side of the contact portion: as described previously (in the part where the problem to be solved by the present invention is described),the transfer field downstream of the transfer portion changes suddenly electric static discharge occurs easily, due to this toner splash (especially splashing of toner after transfer to the transfer medium (already transferred toner)) occurs easily, and there is a fear that it will not be possible to carry out faithful transfer of a toner image which can be reproduced well.

In contrast to this, according to the present invention, as the transfer field rises rapidly on the upstream side of the contact portion and drops away gently on the downstream side of the contact portion, splash of untransferred toner upstream of the contact portion and already transferred toner on the downstream side of the contact portion is controlled.

Consequently, according to the present invention, at the same time as obtaining smooth movement of the transfer medium, irregular splashing of untransferred toner and splashing of already transferred toner is controlled, and it is possible to carry out faithful transfer of a toner image which can be reproduced well.

According to another aspect of the invention, because the film is supported by a supporting member disposed separated by a gap from the image carrier, is capable of displacement between the support and the image carrier, and contacts and disengages the transfer medium according to the presence or absence of electrostatic adsorptive force due to the supply or withdrawal of an electric current, when the current is supplied to the film, the film automatically contacts the back surface of the transfer medium due to the electrostatic adsorptive force, while passing this contact portion the transfer field is applied between the image carrying member and the transfer medium, and when the electric current is not supplied, as the electrostatic adsorptive force disappears, the film automatically withdraws from the transfer medium.

Consequently, because the film only contacts the back surface of the transfer medium at the time of the transfer operation, this prevents staining of the back surface of the transfer medium.

However, because the film contacts the transfer medium by means of electrostatic adsorptive force, the contact pressure can be made extremely light, and a more favorable transfer condition can be obtained.

Furthermore, conventionally the transfer pressure is heavy and the problem of center void (a phenomenon whereby image loss occurs because the central portion of an image cannot be transferred) occurs, but according to the present invention, as the transfer pressure can be made light, it is possible to prevent the occurrence of center void.

DETAILED DESCRIPTION OF THE PREFERRED EMBODIMENTS

Figure 1:
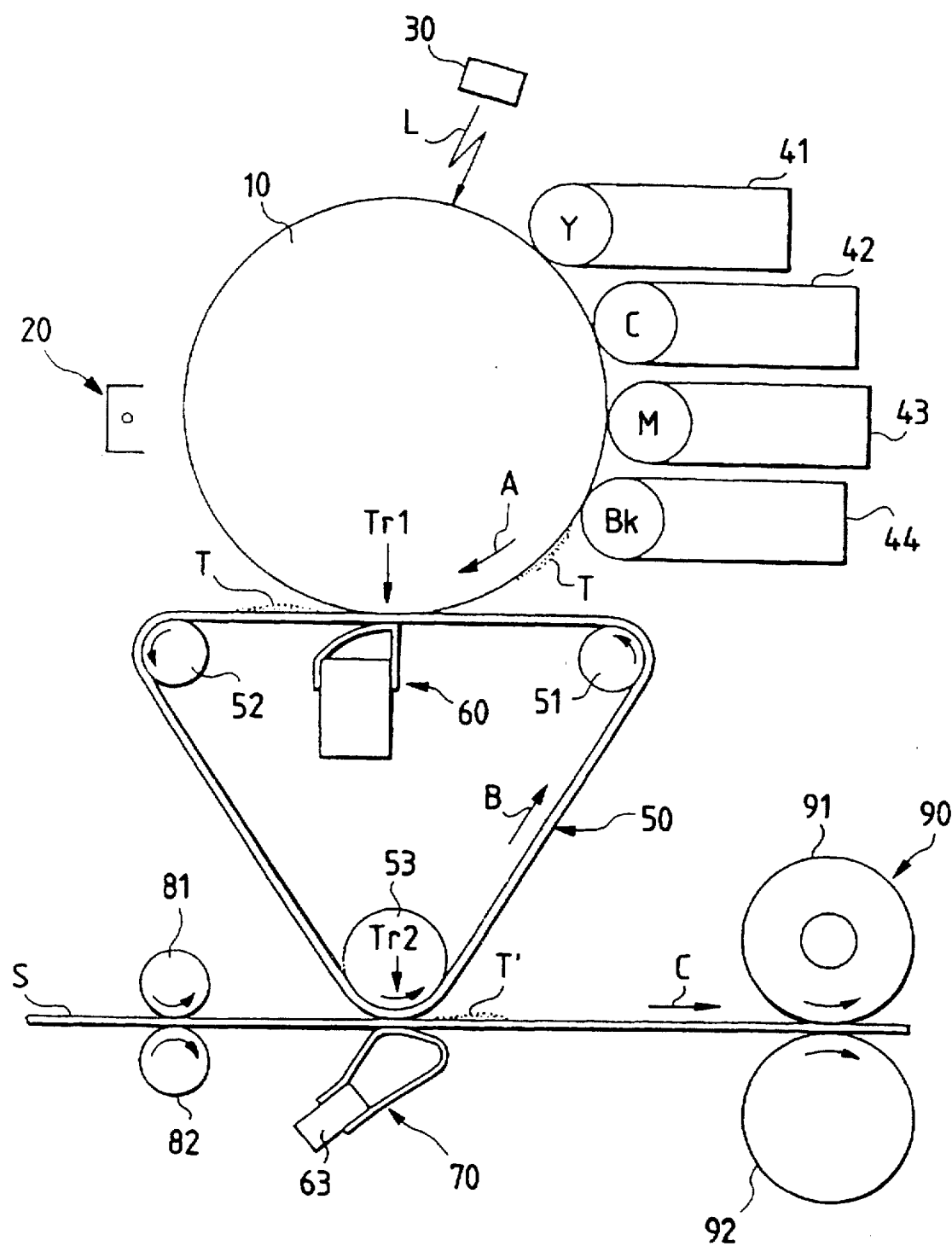
FIG. 1 is a schematic view showing the main components of a first embodiment of an image forming apparatus related to the present invention.

Referring now to the drawings, the embodiments of the present invention will be explained below.

1st Embodiment

FIG. 1 is a shematic view showing the main components of an image forming apparatus in a drawing showing a first embodiment of an image forming apparatus related to the present invention.

In this drawing, the reference numeral 10 is a photosensitive drum, as an image carrier, rotated in the direction of an arrow A in the drawing by a drive means not shown in the drawing.

On the circumference of the photosensitive drum 10, charging means 20, exposing means 30, developing means 41 (yellow), 42 (cyan), 43 (magenta) and 44 (black)for four colors and an intermediate transfer medium 50 as a first transfer means are disposed following the direction of rotation. The photosensitive drum and all the above-mentioned means are constructed by means of well-known technology.

The intermediate transfer medium 50 is constructed of a conventional endless belt-like material, wrapped around drive rollers 51, 52 and 53, and driven circulatively in the direction of an arrow B in the drawing.

The intermediate transfer medium 50 contacts the photosensitive drum 10 between the drive rollers 51 and 52. A first transfer means 60 is disposed on the opposite side of this contact portion (Tr1) and forms first transfer portion Tr1 at the contact portion of the photosensitive drum 10 and intermediate transfer medium 50.

Furthermore, the intermediate transfer medium 50 contacts a recording medium as a second transfer medium S (paper etc.) at the outer circumferential surface of the portion wrapping onto the drive roller 53. A second transfer means 70 is disposed on the opposite side of this contact portion (Tr2), and forms second transfer portion Tr2 at the contact portion of the intermediate transfer medium 50 and second transfer medium S. Additionally, a recording medium S is supplied to the transfer portion Tr2 by means of conveying rollers 81 and 82, and is conveyed in the direction of an arrow C.

The reference numeral 90 is a fixing means, comprising a fixing roller 91 having an internal heat source and a pressure roller 92 pushed thereupon.

According to this type of an image forming apparatus, the photosensitive drum 10 rotates in the direction of the arrow A, and its surface is uniformly charged by the charging means 20. After that, an electrostatic latent image is formed on the surface of the photosensitive drum 10 by means of scanning by such as a laser beam L generated from the exposing means 30, and this latent image is developed by yellow toner by means of the first color developing means 41. This Loner image T is transferred from the photosensitive drum 10 to the surface of the intermediate transfer medium 50 by means of the effect of an electrical field applied by the first transfer means 60 at the first transfer portion Tr1. Next, the surface of the photosensitive drum 10 is uniformly charged again by the charging means 20, an electrostatic latent image is formed on the surface of photosensitive drum 10 by means of scanning by such as a laser beam L generated from the exposing means 30, and this latent image is developed by cyan toner by means of the second color developing means 42. This toner image T is transferred to the surface of the intermediate transfer medium 50 at the first transfer portion Tr1. Thereafter, in the same way, a magenta toner image developed by means of the third color developing means 43 is transferred to the surface of the intermediate transfer medium 50, a black toner image developed by means of fourth color developing means 44 is transferred to the surface of intermediate transfer medium 50, and a full-color toner image is transferred to the surface of the intermediate transfer medium 50.

This full-color toner image T' is transferred to the surface of the recording medium S from the intermediate transfer medium 50 by means of the effect of an electrical field applied by the second transfer means 70 at second transfer portion Tr2. Furthermore, recording medium S is conveyed at a prescribed timing with respect to the second transfer portion Tr2.

After that, the toner image T' is fixed on the surface of the recording medium S by the recording medium S passing through the fixing means 90.

Furthermore, as can be understood from the explanation above, intermediate transfer medium 50 fulfills the role of a transfer medium in the first transfer portion Tr1, and fulfills the role of an image carrier in the second transfer portion Tr2.

Figure 2A:
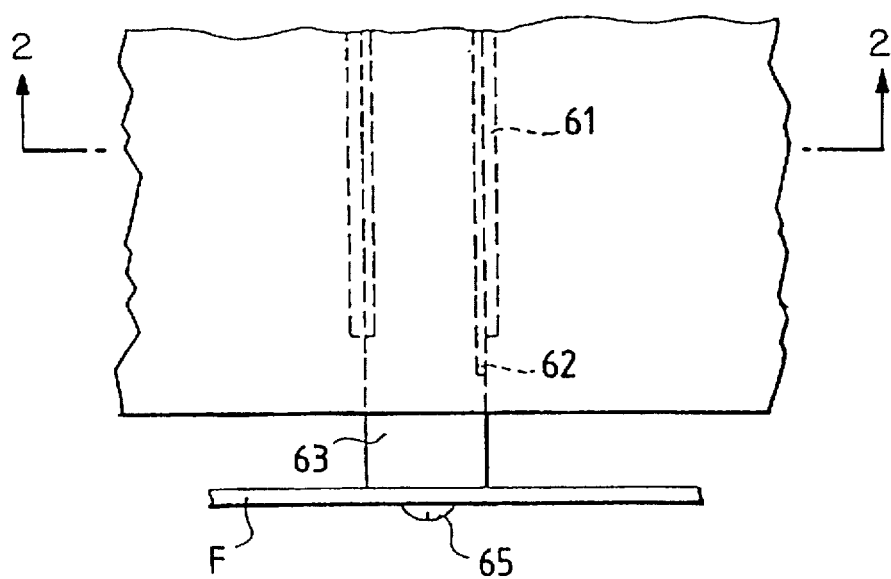
FIGS. 2(a) and 2(b) are schematic views showing a first transfer portion and a first transfer means.
Figure 2B:
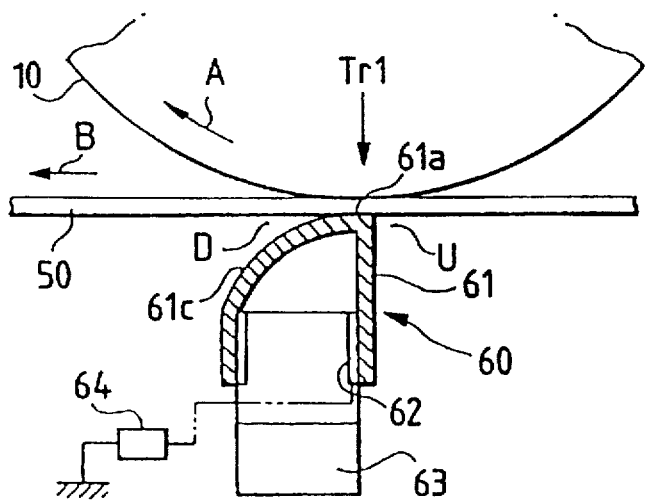

FIGS. 2(a) and 2(b) show the first transfer portion Tr1 and first transfer means 60. FIG. 2(a) is a partial plan view, and FIG. 2(b) is a partial cross-sectional view (cross section 2—2 in FIG. 2(a)).

As shown in this drawing, the first transfer means 60 has a film 61. This film 61 is supported by a support 63 via a thin plate-like supporting member 62 having electrical conductivity, and lightly contacts the back surface of the intermediate transfer medium 50. Then, this film 61 rises rapidly with respect to a contact portion 61a with the back surface of intermediate transfer medium 50 on the upstream side U of the direction of movement of the intermediate transfer medium 50 relative to the film , and slopes gently from the contact portion 61a in a continuous curve 61c on a downstream side D of the direction of movement. Supporting member 62 is in a state of electrical conductance with film 61, and an electric current is supplied to film 61 from a power source 64 via this supporting member 62.

Furthermore, the support 63 is fixed into an image forming apparatus frame F by a screw 65, and the supporting member 62 is joined to the support 63 and film 61. A contuctive adhesive or the like is utilized for the connection between the supporting member 62 and film 61.

Figure 3A:
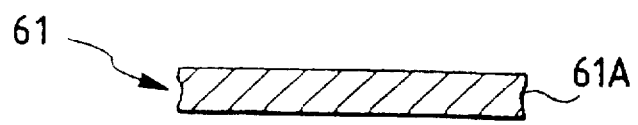
FIGS. 3(a) to 3(d) are cross-sectional views showing examples of the construction of the film.
Figure 3B:
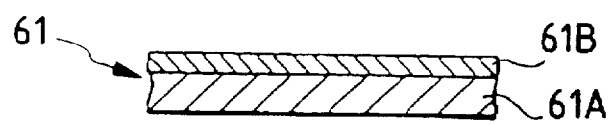
Figure 3C:
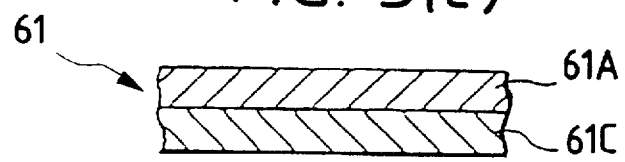
Figure 3D:
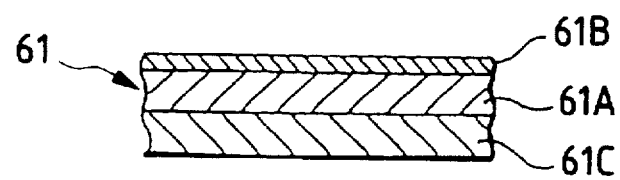

It is preferable if the construction of the film 61 itself allows the application of a transfer field between the photosensitive drum 10 and intermediate transfer medium 50, it is possible to employ various configurations: for example, a single-layer film (comprising a resistance layer 61A only) as shown in FIG. 3 (a); a two-layer film made of a resistance layer 61A and a surface layer 61B as shown in FIG. 3(b); a two-layer film made of a conductive layer 61C and a resistance layer 61A as shown in FIG. 3(c); and a three-layer film made of a conductive layer 61C, a resistance layer 61A and a surface layer 61B as shown in FIG. 3(d). In the case of using a single-layer film comprising a resistance layer 61A only as film 61 (as shown in FIG. 3(a)), the front surface of the film 61A contacts the intermediate transfer medium 50 and the back surface is connected to the supporting member 62. in the case of using a double-layer film comprising a resistance layer 61A and a surface layer 61B as shown in FIG. 3(b), the surface layer 61B contacts the intermediate transfer medium 50 and the resistance layer 61A is connected to the supporting member 62. In the case of using a double-layer film comprising a conductive layer 61C and a resistance layer 61A as shown in FIG. 3(c), the resistance layer 61A contacts the intermediate transfer means 50 and the conductive layer 61C is connected to the supporting member 62. In the case of using a three-layer film comprising a conductive layer 61C, a resistance layer 61A and a surface layer 61B as shown in FIG. 3(d), the surface layer 61B contacts the intermediate transfer medium 50 and the conductive layer 61C is connected to the supporting member 62.

It is possible to employ a dispersed conductive material film, a conductive resin or a semiconductive resin or the like as the resistance layer 61A. Furthermore, it is also possible to employ a simple substance such as a metal thin plate or thin film of stainless steel, steel, nickel or aluminum. For a dispersed conductive material film, a film comprising a substance belonging to groups a) and b) below dispersed/dissolved within a resin chosen from groups c) to f) is cited. Furthermore, it is possible to cite a substance belonging to groups a) and b) below dispersed/dissolved within a substance having rubber elasticity cited in either group g) or groups h) to j) below or the like. A substance chosen from group b) below is cited as the conductive resin. A substance chosen from group c) below is cited as the semiconductive resin.

The conductive layer 61C has the role of supplying an electrical charge (electric current) from the supporting member 62 having electrical conductivity to the resistance layer 61A. Consequently, it has a lower resistance than that of the resistance layer 61A, and it does not matter if the layer thickness (film thickness) is small. It is possible to employ such as a metal vapor deposition film, a dispersed conductive material film or a conductive resin as conductive layer 61C. Vapour deposited metals and alloys such as aluminum, indium, nickel, tin and steel are cited as the metal vapor deposition film. For a dispersed conductive material film, a film comprising a substance belonging to groups a) and b) below dispersed/dissolved within a resin chosen from groups c) to f) is cited. A substance chosen from group b) below is cited as the conductive resin.

The surface layer 61B plays the roles of, among others, protecting the film from wear or the like, preventing the exudation of low-molecular-weight components from a layer underneath the surface layer 61B, and increasing the releasability of the toner, and is a substance chosen from groups c) to f) of substances listed below. Furthermore, it is possible to cite a substance chosen from groups a) and b) below dispersed/dissolved within a resin cited in groups c) to f).

Substance Group a:
Carbon blacks (e.g. furnace black, acetylene black and carbon fillers), metallic oxide powders (e.g. ITO powder and SnO2 powder), metal or alloy powders (e.g. Ag powder and Al powder), and salts (e.g. quaternary ammonium salt and perchlorate).

Substance Group b:
Electrically conductive resins such as polyvinyl aniline, polyvinyl pyrrole, polydiacetylene, polyethyleneimine, and polymethyl methacrylate including quaternary ammonium salt.

Substance Group c:
Resins such as ethyl cellulose, nitrocellulose, methoxymethylated nylon, ethoxymethylated nylon, copolymerized nylon, polyvinyl pyrrolidone and casein, or a mixture of these resins.

Substance Group d:
Thermoplastic resins including acrylic resins such as polyacrylate and polymethacrylate; styrene resins such as polystyrene and poly-1-methylstyrene; butyral resin; polyvinyl chloride; polyvinylidene chloride; polyvinyl fluoride; polyvinylidene fluoride; polyester resin; polycarbonate resin; cellulose resin; polyarylate resin; polyethylene resin, nylon resin, and polypropylene resin; or a copolymer or mixture thereof.

Substance Group e:
Water-soluble resins such as polyvinyl alcohol; polyaryl alcohol; polyvinyl pyrrolidone; polyvinylamine; polyarylamine; polyvinylacrylate; polyvinyl methacrylate; polyvinyl sulphuric acid; polylactic acid; casein; hydroxypropyl cellulose; starch; gum arabic; polyglutamic acid; polyaspartic acid; and nylon resin; or a copolymer or mixture thereof.

Substance Group f:
Thermosetting resins such as epoxy resin; silicone resin; urethane resin; melamine resin; alkyd resin; polyimide resion; polyamide resin; and fluorine resin.

Substance Group g:
Natural rubber.

Substance Group h:
Synthetic rubbers such as silicon rubber; fluorine rubber; fluorosilicon rubber; urethane rubber; acryl rubber; hydrin rubber; epichlorohydrin rubber; butadiene rubber; styrene-butadiene rubber; nitrile-butadiene rubber; isoprene rubber; chloroprene rubber; isobutylene-isoprene rubber; ethylene-propylene rubber; chlorosulfonated polyethylene; and thiokol, or a mixture thereof.

Substance Group i:
Elastomer materials including styrol resin; vinyl chloride resin; polyurethane resin; polyethylene resin methacrylic resin and the like.

Substance Group j:
Soft foam materials such as polyurethane foam; polystyrene foam; polyethylene foam; elastomer foam, and rubber foam.

The construction of a film with 2 layers or more is carried out as follows.

Firstly, a base is formed. It is possible to use a conductive layer or a resistance layer as described above for the base. Methods of preparing the base include a method wherein the substance constituting the base is thermally melted, is dispersed or mutually dissolved, and is extruded, thereby being molded into the form of a film; or a method wherein the substance constituting the base is dissolved in a solvent, is dispersed or mutually dissolved (is polymerized), and is extruded, thereby being molded into the form of a film.

Next, either one or a plurality of conductive layers (apart from the case where a conductive layer is utilized as a base), resistance layers (apart from the case where a resistance layer is utilized as a base), and surface layers are formed on top of the base. These are formed by a method wherein each substance is dissolved in a solvent, dispersed or dissolved (is polymerized), and is dip-coated or spray-coated.

Figure 4A:
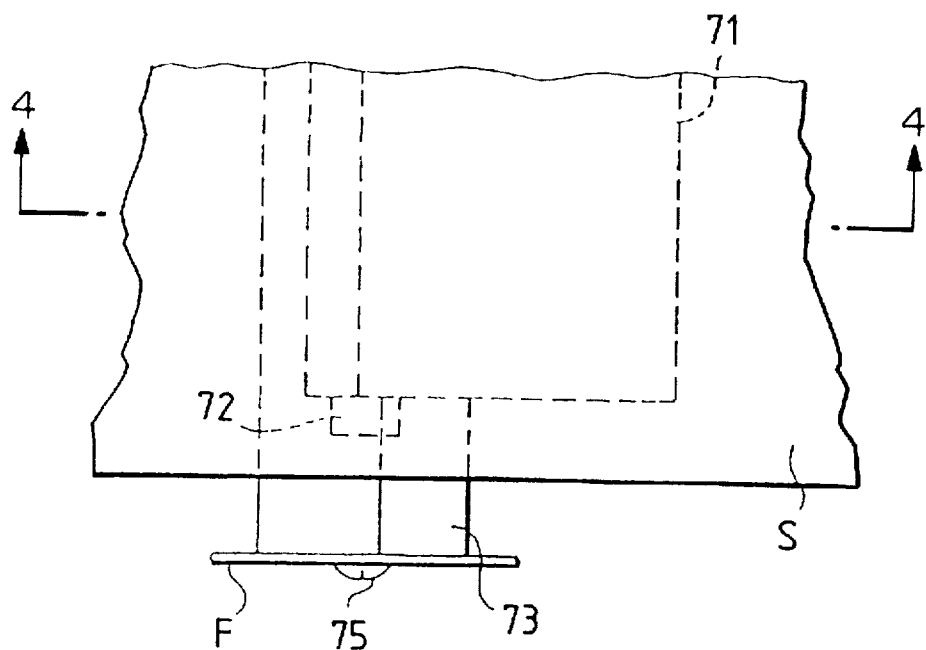
FIGS. 4(a) and 4(b) are schematic views showing a second transfer portion and a second transfer means.
Figure 4B:
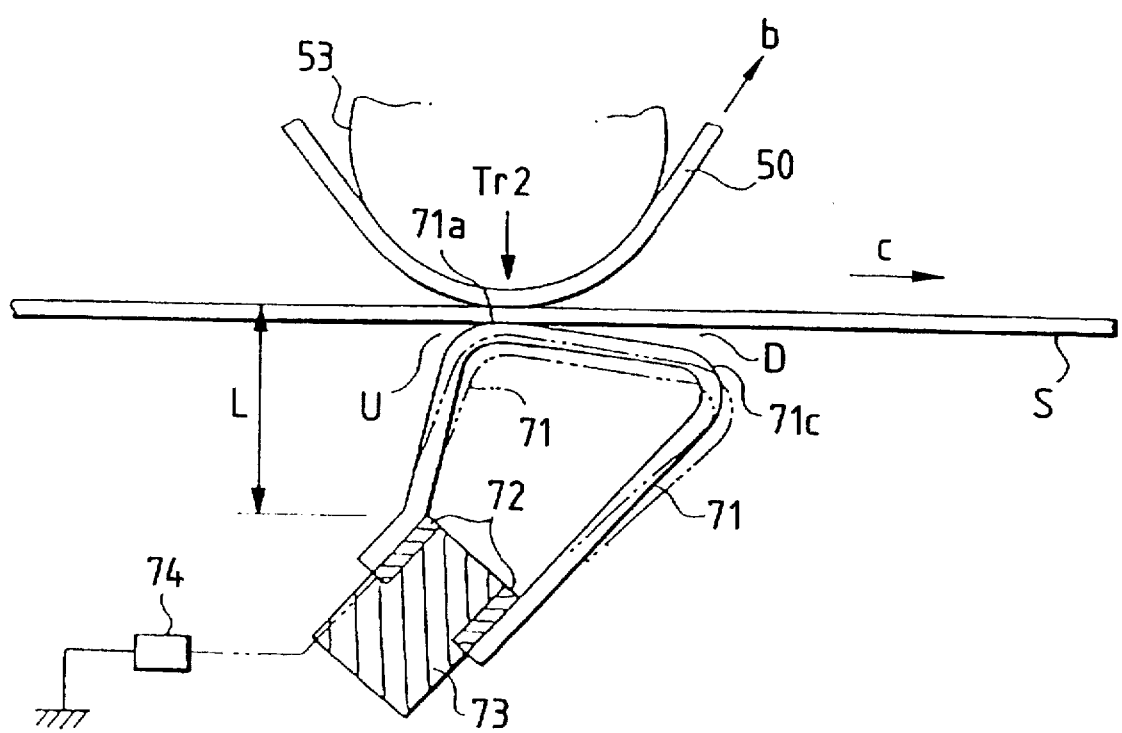

FIGS. 4(a) and 4(b) show the second transfer portion Tr2 and second transfer means 70. FIG. 4.(a) is a plan view, and FIG. 4(b) is a cross-sectional view (cross section 4—4 in FIG. 4(a)).

As shown in this drawing, the second transfer means 70 has a film 71. The film 71 is supported by the support 73 via a supporting member 72 having electrical conductivity.

The supporting member 72 is in electrical conductance with the film 71, and an electrical current is supplied to the film 71 from a power source 74 via the supporting member 72.

Furthermore, the support 73 is fixed into the image forming apparatus frame F by a screw 75, and the supporting member 72 is joined to the support 73 and film 71. A conductive adhesive or the like is utilized for the connection between supporting member 72 and film 71.

The intermediate transfer medium 50 fulfills the role of an image carrier in the second transfer portion Tr2. The support 73 is arranged separated from the intermediate transfer medium 50 by distance L.

When an electrical current is not supplied to film 71 from the power source 74, as shown by the shaded line in FIG. 4 (b), the film 71 is separated from the intermediate transfer medium 50 by its own shape retention. Then, when an electrical current is supplied from the power source 74, an electric charge moves along the electrical current path power source 74 through the supporting member 72 to the film 71; and an electrostatic adsorptive force operates between the surface of the film 71 and intermediate transfer medium 50. By means of this force, as shown by the solid line in FIG. 4 (b), the film 71 lightly contacts the back surface of the recording medium S.

That is, the film 71 is between the support 73 and intermediate transfer medium 50 capable of displacement, and contacts and disengages the recording medium S according to the presence or absence of electrostatic adsorptive force due to the supply or withdrawal of an electric current.

Then, when the film 71 contacts the recording medium S, the film 71 rises rapidly with respect to the contact portion 71a with the back surface of the recording medium S in an upstream direction U to the direction of movement of the recording medium S relative to the film 71, and slopes gently from the contact portion 71a with a continuous curve 71c in a downstream D to the direction of movement.

It is desirable if the construction of the film 71 itself, while giving it the electrostatic adsorptive force effect described above, makes it possible to apply a transfer field between the intermediate transfer medium 50 and recording medium S, and it is possible to employ the same construction as the film 61 described above.

According to the image forming apparatus described above, the following kind of effect is obtained.

(i) A toner image formed on the surface of the image carrier (the photosensitive drum 10 at the first transfer portion Tr1 and the intermediate transfer medium 50 at the second transfer portion Tr2) is transferred to the surface of a transfer medium due to the effect of a transfer field applied between the image carrier and transfer medium (the intermediate transfer medium 50 at the first transfer portion Tr1 and the recording medium S at the second transfer portion Tr2) by the transfer means 60 or 70.

As the transfer means (60 at the first transfer portion Tr1, 70 at the second transfer portion Tr2) has a film (61 at the first transfer portion Tr1, 71 and the second transfer portion Tr2) lightly contacting the back surface of the transfer medium and applying the transfer field, the transfer field is applied between the image carrier and the transfer medium by means of this film.

Then, as the film is constructed to lightly contact the back surface of the transfer medium, it does not lave a great resistance with respect to a moving transfer medium, and consequently a smooth movement of the transfer medium is obtained. Furthermore, supposing the film was constructed not to contact the transfer medium, the transfer field applied between the image carrier and the transfer medium would broaden and it would be easy for toner splashing to occur; but according to the form of this embodiment, the film contacts the transfer medium, broadening of the transfer field is prevented and it is difficult for toner splashing to occur.

Furthermore, as the film 71 rises rapidly with respect to a contact portion (61a at the first transfer portion Tr1, 71a at the second transfer portion Tr2) with the back surface of the transfer medium in an upstream direction U to the direction of movement of the transfer medium relative to the film, and slopes gently from the contact portion with a continuous curve downstream D to the direction of movement, the transfer field rises rapidly at a contact portion on the upstream side U of the contact portion, and slopes gently from the contact portion with a continuous curve on the downstream side D of the contact portion. Supposing there was a construction wherein the transfer field rose gently at a contact portion on the upstream side U of the contact portion, toner adhered to the surface of the image carrier (un-transferred toner) would begin to splash irregularly towards the surface of the transfer medium before reaching the transfer portion; and there would be the fear that an easily reproducible transfer could not be faithfully obtained.

Furthermore, supposing there was a construction wherein the transfer field fell away steeply at a contact portion on the downstream side D of the contact portion, as described previously, the transfer field on the downstream side D of the contact portion would change rapidly, it would be easy for electrical discharges to occur, and it would become easy for toner splashing (especially toner after being transferred to the transfer medium (already-transferred toner)) to occur due to this discharge, and there would be the fear that an easily reproducible transfer could not be carried out faithfully.

In contrast to this, according to this embodiment, as the transfer field rises rapidly on the upstream side U of the contact portion, and slopes gently with a continuous curve on the downstream side D of the contact portion, splashing of un-transferred toner on the upstream side U of the contact portion, and splashing of already-transferred toner on the downstream side D of the contact portion is suppressed.

Consequently, according to the first embodiment of the image forming apparatus, at the same time as obtaining smooth movement of the transfer medium, irregular splashing of un-transferred toner and splashing of already-transferred toner is suppressed, and transfer of a good reproduction is carried out faithfully.

(ii) Furthermore, because the film 71 is supported by the support 73 disposed separated by the gap U from the intermediate transfer medium 50, is capable of displacement between the support 73 and the intermediate transfer medium 50, and contacts and disengages the recording medium S according to the presence or absence of electrostatic adsorptive force due to the supply or withdrawal of an electric current, when the current is supplied to the film 71, the film automatically contacts the back surface of the recording medium S due to the electrostatic adsorptive force, while passing this contact portion, the transfer field is applied between the intermediate transfer medium 50 and recording medium S, and when the electric current is not supplied, as the electrostatic adsorptive force disappears, the film 71 automatically withdraws from the recording medium S.

Consequently, because the film 71 only contacts the back surface of the transfer medium at the time of the transfer operation, this prevents staining of the back surface of the transfer medium.

Moreover, because the film 71 contacts the back surface of the recording medium S by means of electrostatic adsorptive force only at the time of the transfer operation, staining of the back surface of the recording medium S-is prevented.

Furthermore, conventionally the transfer pressure is heavy and the problem of center void (a phenomenon whereby an image loss occurs because the central portion of an image cannot be transferred) occurs, but according to the image forming apparatus of this embodiment, as the transfer pressure can be made light, it is possible to prevent the occurrence of center void.

Furthermore, it is possible to employ the second transfer means 70 instead of transfer means 60 at transfer portion Tr1.

2nd Embodiment

Figure 5:
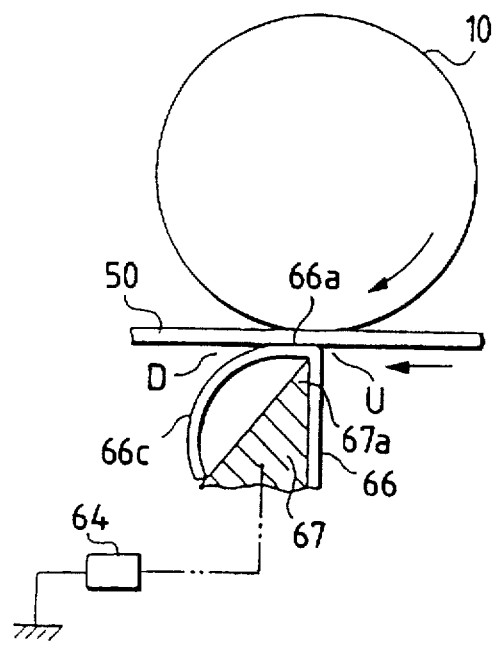
FIG. 5 is a schematic view showing a transfer portion of a second embodiment of an image forming apparatus related to the present invention.

FIG. 5 is a schematic view showing the transfer portion of an image forming apparatus in a drawing showing the main components of the second embodiment of an image forming apparatus related to the present invention. In this drawing, the same reference numerals are attached to components which are the same as in the first embodiment described above.

The point of difference between the second embodiment and the first embodiment described above is the cross-sectional shape of first transfer means 60, there are no changes with respect to the other points.

The reference numeral 66 in FIG. 5 is a film, supported by a support 67 having electrical conductance, and lightly contacting the back surface of the intermediate transfer medium 50.

The support 67 has a triangular-shaped cross-section, of which opposing portion 67a (opposing the intermediate transfer medium 50) is formed with an acute angle, and the film 66 is supported by the support 67 and rises sleeply with respect to the contact portion 66a with the back surface of the intermediate transfer medium 50 on the upstream side U of the direction of movement of the intermediate transfer medium 50, and gently falls in a continuous curving line 66c from the contact portion 66a on the downstream side D of the direction of movement. The support 67 is in electrical conductance with the film 66, and an electrical current is supplied to the film 66 from a power source 64 via the support 67.

Furthermore, it is possible to adopt the same construction for the film 66 as that of the film 61 in the first embodiment.

According to this kind of construction also, the same effect is obtained as that obtained by (i) in the first embodiment described above.

3rd Embodiment

Figure 6:
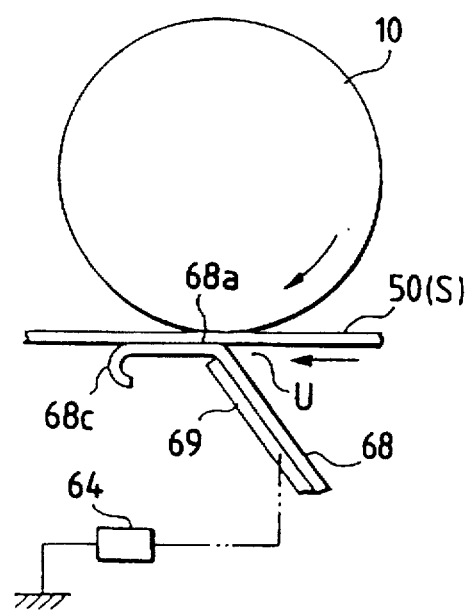
FIG. 6 is a schematic view showing a transfer portion of a third embodiment of an image forming apparatus related to the present invention.

FIG. 6 is a typical view showing the transfer portion of an image forming apparatus in a drawing showing the main components of a third embodiment of an image forming apparatus related to the present invention. In this drawing, the same reference numerals are attached to components which are the same as in the first embodiment described above.

The point of difference between the third embodiment and the first embodiment described above is the cross-sectional shape of the first transfer means, there are no changes with respect to the other points.

The reference numeral 68 in FIG. 6 is a film, supported by a flat plate-shaped support 69 having electrical conductance, and lightly contacting the back surface of the intermediate transfer medium 50.

The film 68 rises steeply with respect to the contact portion 68a with the back surface of the intermediate transfer medium 50 on the upstream side U of the direction of movement of the intermediate transfer medium 50, and gently falls in a continuous curving line 68c from the contact portion 68a on the downstream side D of the direction of movement. The support 69 is in electrical conductance with the film 68, and an electrical current is supplied to film 68 from a power source 64 via the support 69. Furthermore, it is possible to adopt the same construction for film 68 as that of film 61 in the first embodiment.

It is possible to employ the second transfer portion Tr2 of the first embodiment as the construction of the transfer portion; it can also be used when an intermediate transfer medium 50 is not used and a toner image is transferred directly to the recording medium S from the photosensitive drum 10.

According to this kind of construction also, the same effect is obtained as that obtained by (i) in the first embodiment described above.

4th Embodiment

Figure 7:
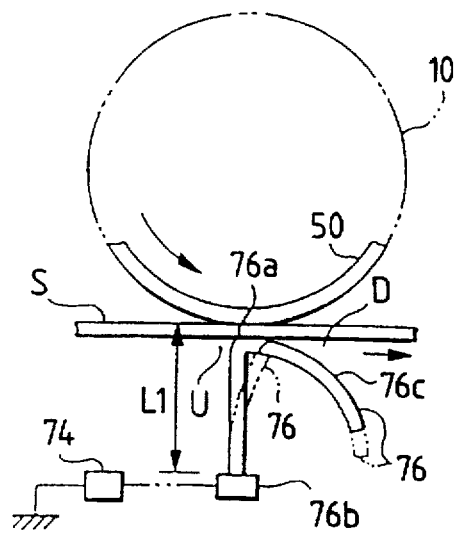
FIG. 7 is a schematic view showing a transfer portion of a fourth embodiment of an image forming apparatus related to the present invention.

FIG. 7 is a schematic view showing the transfer portion of an image forming apparatus in a drawing showing the main components of a fourth embodiment of an image forming apparatus related to the present invention. In this drawing, the same reference numerals are attached to components which are the same as in the first embodiment described above.

The point of difference between the fourth embodiment and the first embodiment described above is the cross-sectional shape of the second transfer means, there are no changes with respect to the other points.

The reference numeral 76 in FIG. 7 is a film with a cross section shaped substantially like an inverted hook, the base of which is supported by a support 76b having electrical conductivity.

The Support 76b is in electrical conductance with the film 76, and through this support 76b, an electrical current is supplied to the film 76 from the power source 74.

The support 76b is disposed separated by a gap L1 from the intermediate transfer medium 50.

In the condition wherein an electrical current is not supplied from the power source 74, as shown by the broken lines in FIG. 7, by means of its own shape retention film 76 is in a condition separated from the intermediate transfer medium 50. Then, when an electrical current is supplied from the power source 74, an electrical charge moves along the current flow path passing from the power source through the support 76b to the film 76, and an electrostatic adsorptive force takes effect between the surface of the film 76 and intermediate transfer medium 50. Due to this force, as shown by the solid lines in FIG. 7, the film 76 lightly contacts the back surface of the recording medium S.

That is, the film 76 is capable of displacement between the intermediate transfer medium 50 and support 76b, and contacts and disengages the recording medium S according to the presence or absence of electrostatic adsorptive force due to the supply or withdrawal of an electric current from the power source 74.

Next, in the condition of contacting the recording medium S, film 76 rises rapidly with respect to a contact portion 76a with the back surface of the recording medium S on the upstream side U of the direction of movement of the recording medium S relative to the film, and slopes gently from the contact portion 76a in a continuous curve 76c on a downstream side D of the direction of movement.

It is desirable if the construction of the film 76 itself, while giving it the electrostatic adsorptive effect described above, makes it possible to apply a transfer field between the intermediate transfer medium 50 and recording medium S, and it is possible to employ the same construction as the film 61 described above.

It is possible to employ the first transfer portion Tr1 of the first embodiment as the construction of the transfer portion; it can also be used when an intermediate transfer medium 50 is not used and a toner image is transferred directly to the recording medium S from the photosensitive drum 10 (please see the broken line in FIG. 7).

According to this kind of construction also, the same effect is obtained as that obtained by (i) and (ii) in the first embodiment described above.

5th Embodiment

Figure 8:
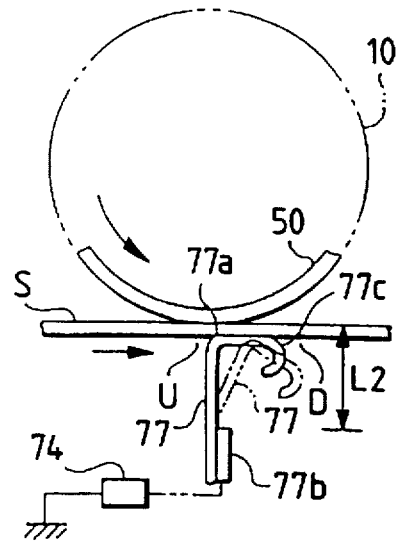
FIG. 8 is a schematic view showing a transfer portion of a fifth embodiment of an image forming apparatus related to the present invention.

FIG. 8 is a schematic view showing the transfer portion of an image forming apparatus in a drawing showing the main components of a fifth embodiment of an image forming apparatus related to the present invention. In this drawing, the same reference numerals are attached to components which are the same as in the first embodiment described above.

The point of difference between the fifth embodiment and the first embodiment described above is the cross-sectional shape of the transfer means, there are no changes with respect to the other points.

The reference numeral 77 in FIG. 8 is a film with a cross section shaped substantially like the letter "L", the base of which is supported by a support 77b having electrical conductivity.

The support 77b is in electrical conductance with the film 77, and through this support 77b, an electrical current is supplied to the film 77 from the power source 74.

The support 77b is disposed separated by a gap L2 from the intermediate transfer medium 50.

In the condition wherein an electrical current is not supplied from the power source 74, as shown by the broken lines in FIG. 8, by means of its own shape retention film 76 is in a condition separated from the intermediate transfer medium 50. Then, when an electrical current is supplied from the power source 74, an electrical charge moves along the current flow path passing from the power source through the support 77b to the film 77, and an electrostatic adsorptive force takes effect between the surface of the film 77 and intermediate transfer medium 50. Due to this force, as shown by the solid lines in FIG. 8, the film 77 lightly contacts the back surface of the recording medium S.

That is, the film 77 is capable of displacement between the intermediate transfer medium 50 and support 77b, and contacts and disengages recording medium S according to the presence or absence of electrostatic adsorptive force due to the supply or withdrawal of an electric current from the power source 74.

Next, in the condition of contacting the recording medium S, film 77 rises rapidly with respect to a contact portion 77a with the back surface of the recording medium S on the upstream side U of the direction of movement of the recording medium S relative to the film, and slopes gently from the contact portion 77a in a continuous curve 77c on a downstream side D of the direction of movement.

It is desirable if the construction of film 77 itself, while giving it the electrostatic adsorptive force effect described above, makes it possible to apply a transfer field between the intermediate transfer medium 50 and recording medium S, and it is possible to employ the same construction as the film 61 described above.

It is possible to employ first transfer portion Tr1 of the first embodiment as the construction of the transfer portion; it can also be used when an intermediate transfer medium 50 is not used and a toner image is transferred directly to recording medium S from the photosensitive drum 10 (please see the broken line in FIG. 7).

According to this kind of construction also, the same effect is obtained as that obtained by (i) and (ii) in the first embodiment described above.

6th Embodiment

Figure 9:
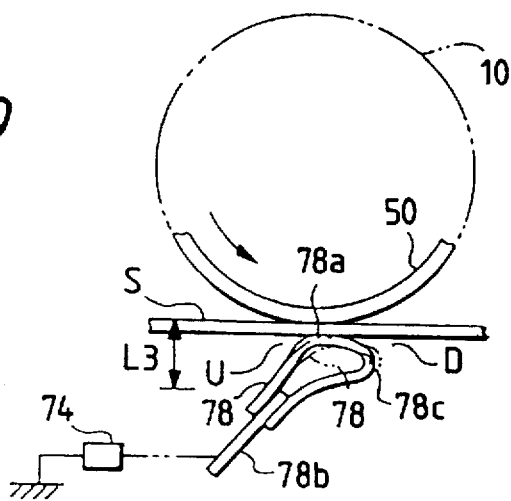
FIG. 9 is a schematic view showing a transfer portion of a sixth embodiment of an image forming apparatus related to the present invention.
Figure 10:
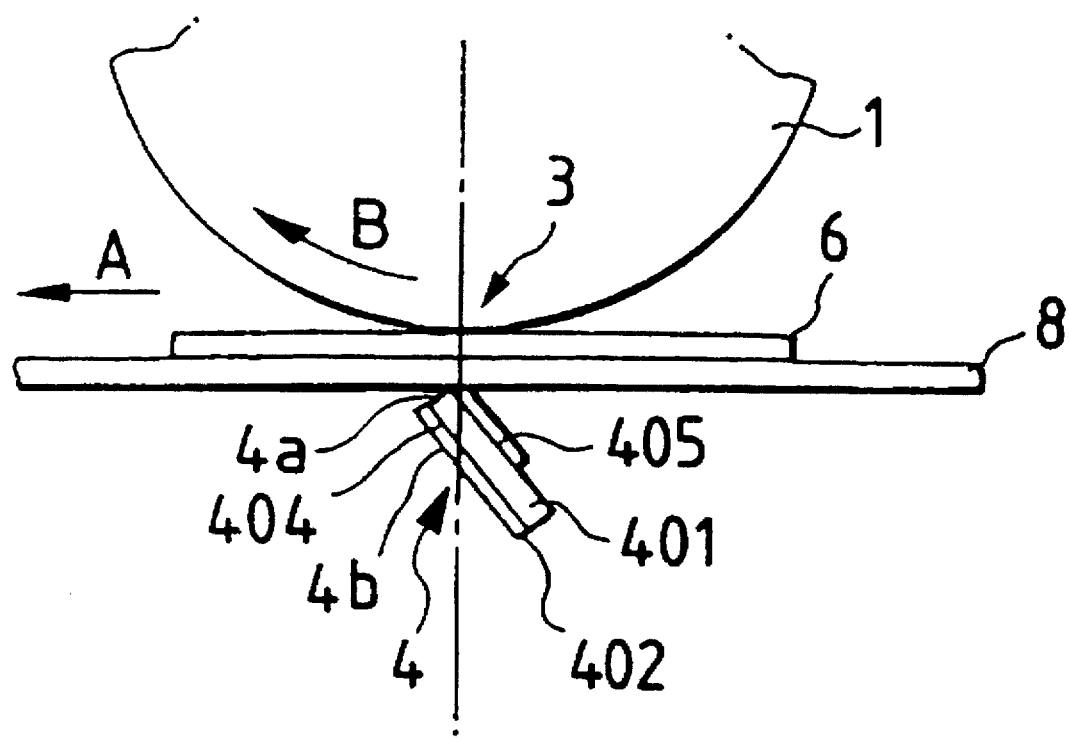
FIG. 10 is an explanatory view of the related art.

FIG. 9 is a schematic view showing the transfer portion of an image forming apparatus in a drawing showing the main components of a sixth embodiment of an image forming apparatus related to the present invention. In this drawing, the same reference numerals are attached to components which are the same as in the first embodiment described above.

The point of difference between the sixth embodiment and the first embodiment described above is the cross-sectional shape of the transfer means, there are no changes with respect to the other points.

The reference numeral 78 in FIG. 9 is a film with a loop-shaped cross section, the base of which is supported by a support 78b having electrical conductivity.

The support 78b is in electrical conductance with the film 78, and through this support 78b, an electrical current is supplied to film 78 from the power source 74.

The support 78b is disposed separated by a gap L3 from the intermediate transfer medium 50.

In the condition wherein an electrical current is not supplied from the power source 74, as shown by the broken lines in FIG. 9, by means of its own shape retention film 78 is in a condition separated from the intermediate transfer medium 50. Then, when an electrical current is supplied from the power source 74, an electric charge moves along the current flow path passing from the power source through the support 78b to the film 78, and an electrostatic adsorptive force takes effect between the surface of the film 78 and intermediate transfer medium 50. Due to this force, as shown by the solid lines in FIG. 9, the film 78 lightly contacts the back surface of the recording medium S.

That is, the film 78 is capable of displacement between the intermediate transfer medium 50 and support 78b, and contacts and disengages the recording medium S according to the presence or absence of electrostatic adsorptive force due to the supply or withdrawal of an electric current from the power source 74.

Next, in the condition of contacting the recording medium S, the film 78 rises rapidly with respect to a contact portion 78a with the back surface of the recording medium S on the upstream side U of the direction of movement of the recording medium S relative to the film, and slopes gently from the contact portion 78a in a continuous curve 78c on a downstream side D of the direction of movement.

It is desirable if the construction of the film 78 itself, while giving it the electrostatic adsorptive effect described above, makes it possible to apply a transfer field between the intermediate transfer medium 50 and recording medium S, and it is possible to employ the same construction as the film 61 described above.

It is possible to employ first transfer portion Tr1 of the first embodiment as the construction of the transfer portion; it can also be used when an intermediate transfer medium 50 is not used and a toner image is transferred directly to the recording medium S from the photosensitive drum 10 (please see the broken line in FIG. 9).

According to this kind of construction also, the same effect is obtained as that obtained by (i) and (ii) in the first embodiment described above.

While the form of the embodiments of the present invention has been described above, the invention is not confined to the forms of the embodiments set forth, and suitable modified embodiments are possible within the scope of the spirit of the present invention.

For example, (i) In the first embodiment, it is possible to employ the transfer means 70 instead of the transfer means 60 at the first transfer portion Tr1, and further, it is possible to employ the transfer means 60 instead of the transfer means 70 at the second transfer portion Tr2.

(ii) The second transfer means 70 in the first embodiment can also be used when the intermediate transfer medium 50 is not used and a toner image is transferred directly to the recording medium S from the photosensitive drum 10.

(iii) In the first embodiment an endless belt is used as the intermediate transfer medium 50, but a transfer drum can also be used.

According to the image forming apparatus of the present invention, as the transfer field rises rapidly on the upstream side of the contact portion, and falls gently on the downstream side of the contact portion, splashing of un-transferred toner on the upstream side of the contact portion and splashing of already transferred toner on the downstream side of the contact portion is suppressed.

Consequently, at the same time as obtaining smooth movement of the transfer medium, irregular splashing of un-transferred toner and splashing of already transferred toner is suppressed, and transfer of a toner image which can be reproduced well is carried out faithfully.

According to the image forming apparatus of the present invention, in addition to above the benefits obtained by the image forming apparatus, the following added effect is obtained.

When an electrical current is supplied to the film, the film automatically contacts the back surface of the transfer medium due to the electrostatic adsorptive force, while passing this contact portion, the transfer field is applied between the image carrying member and the transfer medium, and when the electric current is not supplied, as the electrostatic adsorptive force disappears, the film automatically withdraws from the transfer medium.

Consequently, because the film only contacts the back surface of the transfer medium at the time of the transfer operation, this prevents staining of the back surface of the transfer medium.

However, because the film contacts the transfer medium by means of electrostatic adsorptive force, the contact pressure can be made extremely light, and a more favorable transfer condition can be obtained.

What is claimed is:

1. An image forming method comprising the steps of:

forming a toner image on a surface of an image carrier; and applying a transfer field between the image carrier and a moving transfer medium;

wherein the intensity of the transfer field rises rapidly at an upstream side of a direction of movement of the transfer medium, and continuously and slowly decreases at a downstream side of the direction of movement.

2. An image forming apparatus comprising:

an image carrier, a toner image being formed on a surface thereof; and a transfer means for receiving an electric current that supplies a transfer field between said image carrier and a moving transfer medium to transfer said toner image formed on said surface of said image carrier onto a surface of said moving transfer medium;

wherein said transfer means is supported by a support disposed separated by a gap from said image carrier, and is capable of displacement between said support and said image carrier, and contacts and disengages said transfer medium according to presence and absence of electrostatic adsorptive force due to supply and withdrawal of said electric current.

3. An image forming apparatus comprising:

an image carrier having a surface onto which a toner image is formed; and a film for receiving an electric current that supplies a transfer field between said image carrier and a moving transfer medium to transfer said toner image from said image carrier onto a surface of said moving transfer medium;

wherein said film is supported by a support which is spaced apart from said image carrier, and is displaceable between said support and said image carrier, and contacts and disengages said transfer medium according to the supply and withdrawal of said electric current.

* * * * *